(12) United States Patent
Yamakawa et al.

(10) Patent No.: US 6,354,014 B1
(45) Date of Patent: Mar. 12, 2002

(54) MICROMETER

(75) Inventors: Nobuaki Yamakawa; Shigeji Kudo, both of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/525,853

(22) Filed: Mar. 14, 2000

(30) Foreign Application Priority Data

Mar. 15, 1999 (JP) .......................................... 11-069063

(51) Int. Cl.[7] ................................................ G01B 3/18
(52) U.S. Cl. ........................................ 33/813; 33/821
(58) Field of Search .......................... 33/792, 794, 813, 33/818, 821, 823, 824, 825, 831

(56) References Cited

U.S. PATENT DOCUMENTS

| | | | | | |
|---|---|---|---|---|---|
| 2,488,319 A | * | 11/1949 | Noel | ............................ | 33/821 |
| 2,556,761 A | * | 6/1951 | Keene | .......................... | 33/813 |
| 2,560,850 A | * | 7/1951 | Day | .............................. | 33/813 |
| 3,092,913 A | * | 6/1963 | Bugge | .......................... | 33/818 |

* cited by examiner

Primary Examiner—G. Bradley Bennett
(74) Attorney, Agent, or Firm—Sughrue Mion, PLLC

(57) ABSTRACT

A micrometer (1) includes an anvil (3) and a spindle (4) having a flat plate-like distal end. The anvil (3) includes a small-diameter pin (3C) of a predetermined length formed on a distal end portion of a rod-like anvil body (3A), and a detection portion (5) of a tubular shape fitted on the anvil body (3A) to be slidably moved along the anvil body (3A), a distal end of the detection portion (5) being formed into a plate-like shape, a pin insertion hole being formed in a central portion of the distal end of the detection portion (5), and the pin being inserted in the pin insertion hole. The anvil (3) further includes a dial gauge (10) which is contacted at its distal end with the detection portion (5), and indicates a plus value and a minus value in accordance with the movement of the detection portion (5). The distal end of the anvil (3) is abutted against the distal end of the spindle (4), and when a distal end of the pin (3C) of the anvil (3) coincides with the distal end of the detection portion (5), the dial gauge (10) is set to a zero point. An object (11) to be measured is inserted between the anvil (3) and the spindle (4), and when the distal end of the anvil (3) is brought into abutting engagement with the object to be measured, it is detected from the amount of movement of the detection portion (5) relative to the pin of the anvil body (3A) whether the object to be measured is an appropriate one.

8 Claims, 15 Drawing Sheets

MICROMETER

BACKGROUND OF THE INVENTION

1. Field of the Invention

The present invention relates to a micrometer for measuring an outer diameter of an object to be measured while holding the object. Particularly, the present invention relates to a micrometer capable of easily and accurately determining whether or not any rear burr is formed on a terminal.

The present application is based on Japanese Patent Application No. Hei. 11-69063, which is incorporated herein by reference.

2. Description of the Related Art

Generally, a micrometer, which is an instrument employing a screw spindle of a very precise pitch as measuring means, is used for measuring an outer diameter of a small object. Although such a micrometer is usually used for measuring an outer diameter of an object to be measured, it is also used as a measuring instrument for determining from the measured value of the outer diameter whether or not the measured object is good as a product.

In the production of a wire harness used for transmitting a small electric power or for transferring a signal (such as data and an instruction) to an associated equipment, when a rear burr is formed on the wire harness, this wire harness is not good as a product. Therefore, the product is checked or inspected to determine whether or not any rear burr has been formed on the wire harness.

The measurement of rear burrs of a terminal has heretofore been made, alternately using two micrometers, that is, a point micrometer 100 (shown in FIG. 16) and a blade micrometer 200 (shown in FIG. 17), the point micrometer 100 including an anvil 110 having a pointed distal end, and the blade micrometer 200 including an anvil 210 and a spindle 220 each of which has a flat plate-like distal end. The different between the values, read respectively by the two micrometers, has been calculated, and the determination has been made based on it.

More specifically, first, an object 300 to be measured is inserted between the anvil 110 and a spindle 120 of the point micrometer 100, and the anvil 110 is brought into abutting engagement with the object 300 held in contact with the spindle 120 as shown in FIG. 18A, and the read value is, for example, 0.98. Then, the object 300 is inserted between the anvil 210 and the spindle 220 of the blade micrometer 200, and the anvil 210 is brought into abutting engagement with the object 300 held in contact with the spindle 220 as shown in FIG. 18B, and the read value is, for example, 1.02. The two measured values are different from each other since the position of the anvil 210 during the measurement is different from the position of the anvil of the point micrometer 100 during the measurement. Then, the difference between the two measured values is calculated, and it is determined from this difference whether or not the product is good. Namely, if the calculated difference between the two measured values is zero (0), it is determined that the product is good, and if the calculated difference between the two measured values is, for example, 0.04, it is determined that the product is defective.

Thus, in the related method, the two measured values are obtained using the two micrometers, and then the two measured values are compared with each other so as to determine whether or not any burr is present. In this method of determining the presence of burrs, the measurement is effected, alternately using the two micrometers (that is, the point micrometer and the blade micrometer), and then the difference between the two measured values is calculated, and it is determined whether or not any burr is present. Thus, the two measurements must be effected, and therefore much time is required for the measurement, and a misdetermination due to an error in the calculation often occurs, and the burrs are sometimes crushed by the measuring force (500 gf) of the flat blade. Therefore, there have been encountered problems that a mis-determination occurs, that a change of the measured value due to the shifting of the measurement position occurs, and that the determination can not be effected if a burr is formed on one side portion of the terminal.

SUMMARY OF THE INVENTION

It is an object of the present invention to provide a micrometer which is capable of effecting a measurement in a short time, and can reduce misdeterminations, and can provide the measured value in a stable manner.

To achieve the above object, according to the present invention, there is provided a micrometer which comprises a spindle having a distal end formed in a flat plate-like manner, an anvil including an anvil body formed into a rod-like shape, a pin having a diameter smaller than the anvil body and a predetermined length, the pin being formed on a distal end of the anvil body, a detection portion of a tubular shape fitted on the anvil body, the detection portion being slidably moved along the anvil body, a distal end of the detection portion is formed into a plate-like shape, and the detection portion including a pin insertion hole formed in a central portion of the distal end of the detection portion, wherein the pin is insertable into the pin insertion hole so that the pin projects from the distal end of the detection portion, and a dial gauge brought at its distal end into contact with the detection portion, the dial gauge being capable of indicating one of a plus value and a minus value in accordance with a sliding movement of the detection portion, wherein the distal end of the detection portion is abutted against the distal end of the spindle, and when a distal end of the pin of the anvil body coincides with the distal end of the detection portion, the dial gauge is set to a zero point, and wherein an object to be measured is inserted between the detection portion and the spindle. In the above micrometer, when the distal end of the detection portion is brought into abutting engagement with the object to be measured, whether the object to be measured is an appropriate one is determined from an amount of the sliding movement of the detection portion relative to the pin of the anvil body. Accordingly, the measurement can be effected in a short time, and misdeterminations can be reduced, and the stable measured values can be obtained.

Further, according to the present invention, it is preferable that the above micrometer further comprises a distal end stopper brought into contact with a distal end of the object to be measured, so as to locate the distal end of the object in a predetermined position, and a centering device which grips the object to be measured so as to center the object relative to the anvil and the spindle when the distal end of the object to be measured is abutted against a distal end of the distal end stopper. In this micrometer, the object to be measured is abutted against the distal end stopper so that the object is located in a predetermined position, and is gripped to be located in a centered position between the anvil and the spindle, and then the distal end of the detection portion is brought into abutting engagement with the object to be measured, so that whether the object to be measured is an appropriate one is detected from an amount of the sliding movement of the detection portion relative to the pin of the anvil body. Accordingly, the object to be measured can be easily located in the predetermined position, that is, in the axes of the anvil and the spindle, and therefore the measurement can be effected in a short time, and misdeterminations can be reduced, and the stable measured values can be obtained.

Further, according to the present invention, it is preferable that the distal end stopper is constituted by a micrometer. With this construction, when the distal end of the object to be measured reaches the measurement position, it is prevented from further moving beyond the measurement position, and therefore the distal end of the object to be measured can be easily and accurately located in the measurement position.

Further, according to the present invention, it is preferable that the centering device straddles the distal end of the anvil at the distal end of the spindle, and grips the object from upper and lower sides of the object at distal end measuring portions of the spindle and the anvil intersecting a direction of insertion of the object, thereby centering the object. With this construction, the distal end of the object to be measured can be easily located in the axes of the anvil and the spindle.

Still further, according to the present invention, it is preferable that the centering device comprises a pair of upper and lower claws which hold the object to be measured therebetween from upper and lower sides of the object, and the pair of claws can be moved toward and away from each other by moving a lever upwardly and downwardly. With this construction, the distal end of the object to be measured can be located in the axes of the anvil and the spindle with one touch.

Furthermore, according to the present invention, in the micrometer, whether any burr is present is determined by detecting the amount of the sliding movement of the distal end of the detection portion relative to the distal end of the pin of the anvil body. Accordingly, whether or not any burr is present can be positively determined.

DETAILED DESCRIPTION OF THE PREFERRED EMBODIMENTS

Preferred embodiments of the present invention will now be described with reference to FIGS. 1 to 15.

Figure 1:
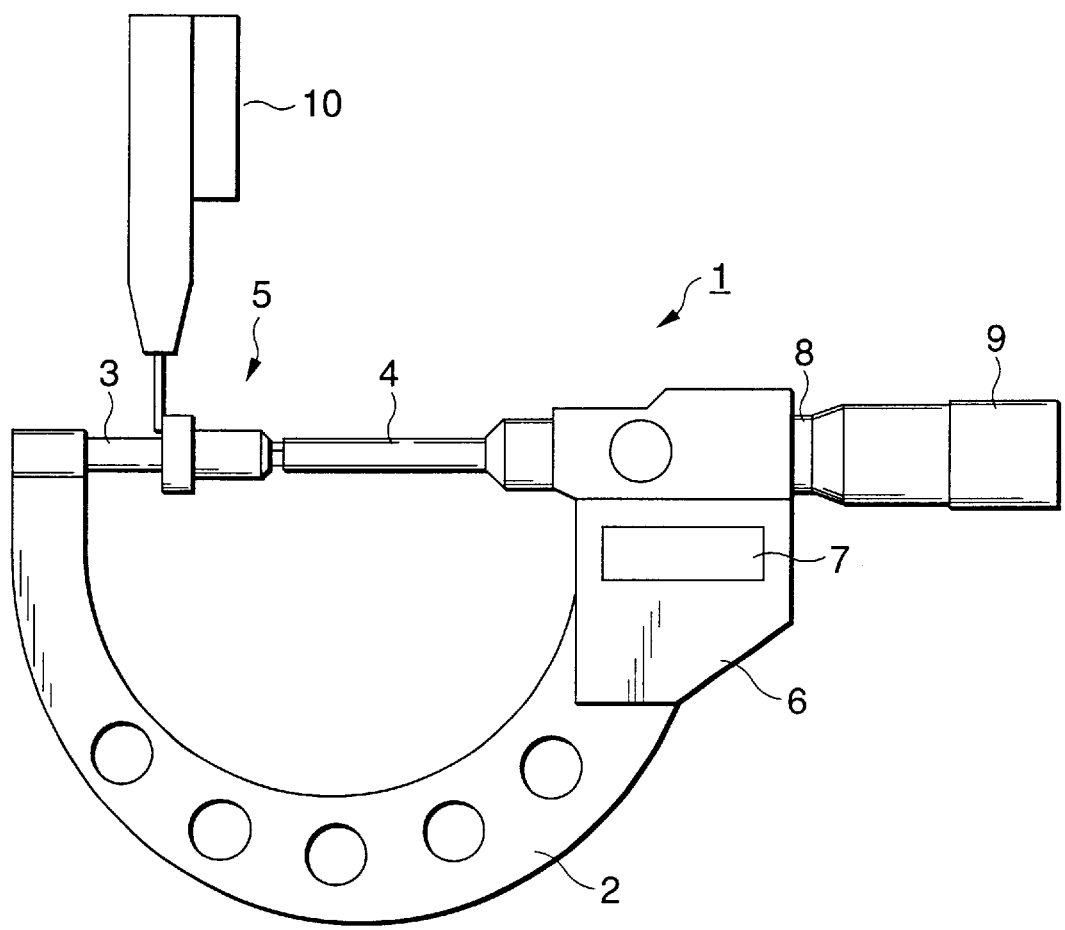
FIG. 1 is a view showing an overall construction of a preferred embodiment of a micrometer of the present invention.

FIG. 1 shows one preferred embodiment of a micrometer of the present invention.

In the drawings, the micrometer 1 includes a bow-like frame 2, and an inwardly-directed anvil 3 is provided at one end of the frame 2. An inwardly-directed spindle 4 is slidably provided at the other end of the frame 2.

A detection portion 5 is fitted on the anvil 3.

A switch portion 6 is mounted on the frame 2. Reference numeral 7 denotes a display portion for displaying a measured value, reference numeral 8 a sleeve, and reference numeral 9 a thimble. A dial gauge 10 for contact with the detection portion 5 at its distal end is fixed in a predetermined position by a suitable method (not shown). The dial gauge 10 is set to a zero point when the distal end of its detection portion contacts the detection portion 5, and a pointer of the dial gauge 10 shifts to the plus (+) side and the minus (−) side in accordance with the movement of the detection portion 5.

Figure 2:
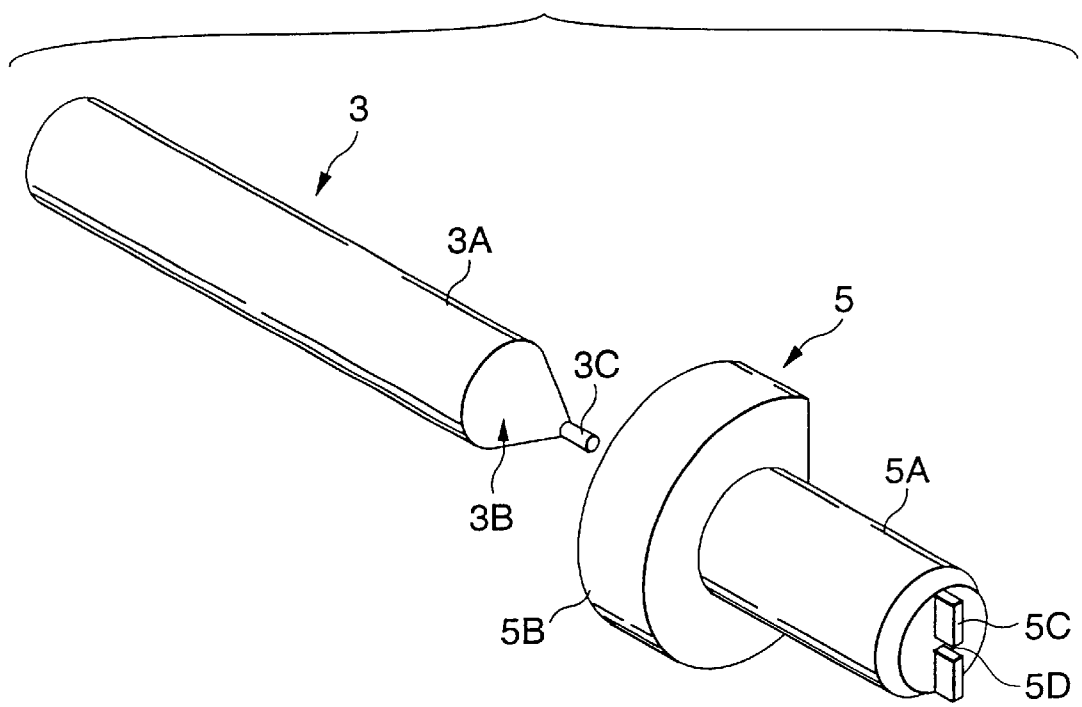
FIG. 2 is a perspective view showing an anvil and a detection portion shown in FIG. 1.

The relation between the anvil 3 and the detection portion 5 is shown in FIG. 2. The anvil 3 includes a rod-like anvil body 3A having a distal end formed into a tapering portion 3B. A pin 3C of a smaller diameter is formed on and projects from a distal end of the tapering portion 3B along the axis of the anvil body 3A.

Figure 3:
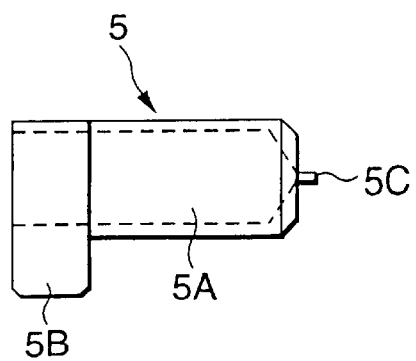
FIG. 3 is a plan view of the detection portion of FIG. 2.
Figure 4:
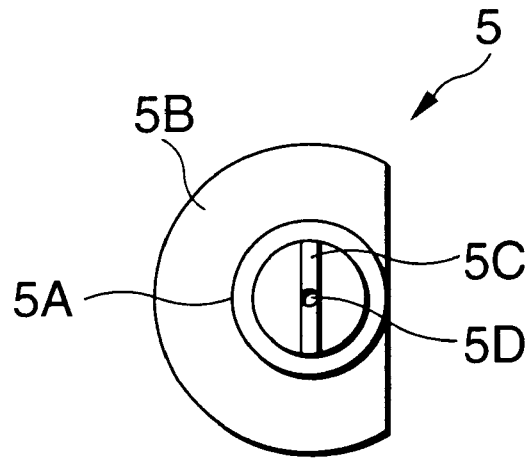
FIG. 4 is a right side-elevational view of the detection portion of FIG. 2.
Figure 5:
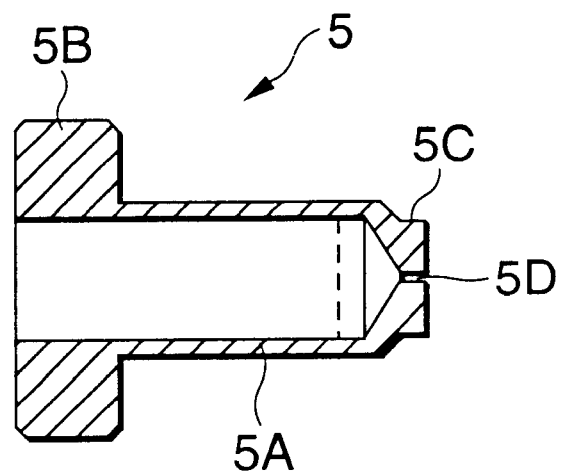
FIG. 5 is a cross-sectional view of the detection portion of FIG. 2.

As shown in FIGS. 3 to 5, the detection portion 5 is formed into a cylindrical shape, and includes a detection portion body 5A having an open rear end. A flange SB, having a diameter larger than the diameter of the detection portion body 5A, is formed on the rear end of the detection portion body 5A. A distal or front end of the detection body portion 5A is closed, and a plate-like blade portion 5C is formed on an outer surface of this distal end. A hole 5D is formed in a central portion of the distal end of the detection portion body 5A.

The anvil 3 is fitted in the detection portion 5, and when the anvil 3 is inserted into the detection portion 5, the pin 3C, formed at the distal end of the tapering portion 3B, is fitted into the hole 5D in the detection portion 5. The pin 3C of the anvil 3 is larger in length than the hole 5D in the detection portion 5.

Next, a measuring method of detecting rear burrs by the use of the micrometer of FIG. 1 will be described with reference to FIGS. 6 to 11.

Figure 6:
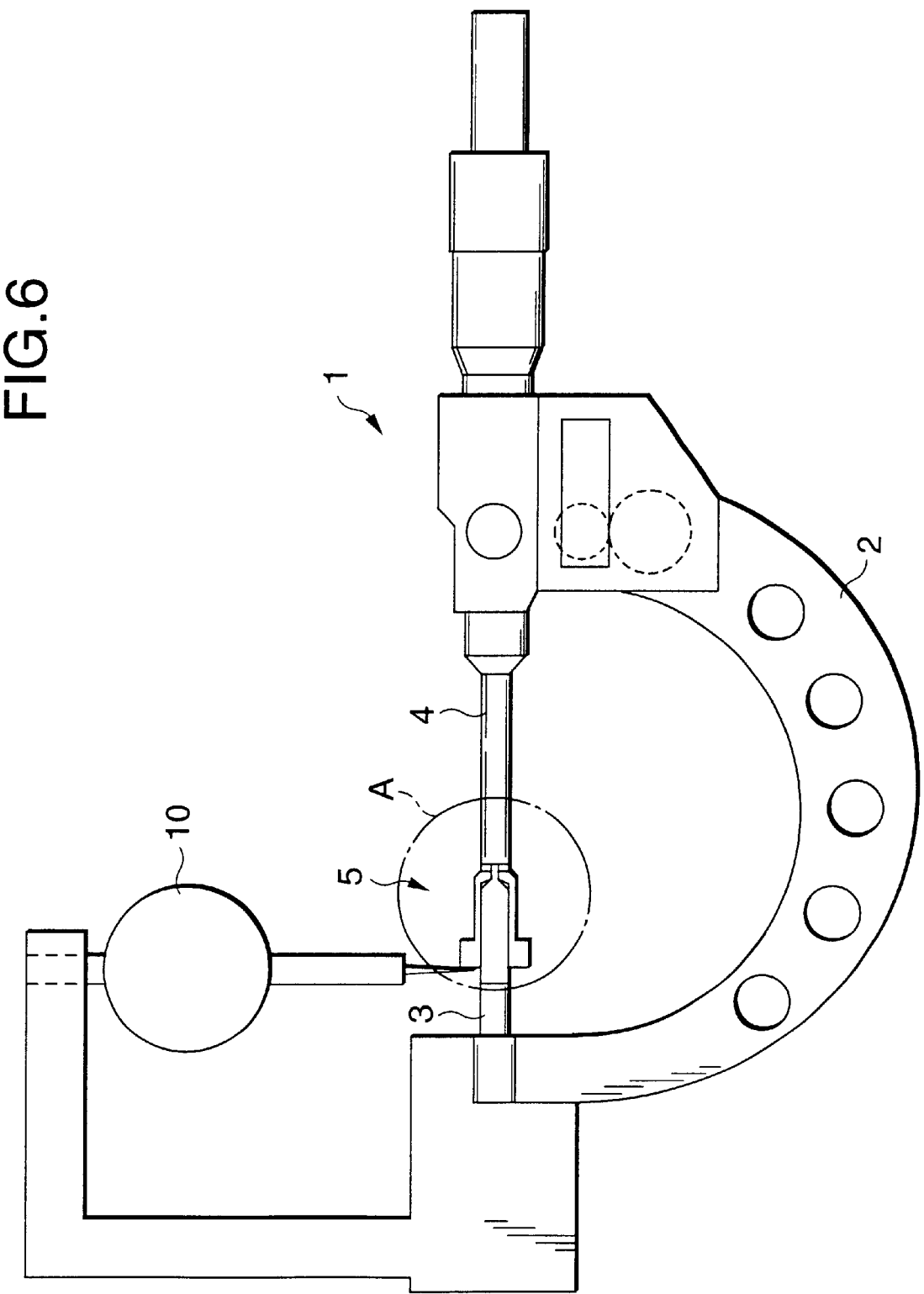
FIG. 6 is a view explanatory of a measurement principle of the micrometer of FIG. 1.

In FIG. 6, an object (for example, a wire harness, not shown) to be measured is held between the anvil 3 and the spindle 4 of the micrometer 1. More specifically, the thimble 9 of the micrometer 1 is turned to move the spindle 4 away from the anvil 3, and then the object to be measured is inserted between the anvil 3 and the spindle 4, and then the thimble 9 is again turned to move the spindle 4 to thereby hold the object between the anvil 3 and the spindle 4.

Figure 7:
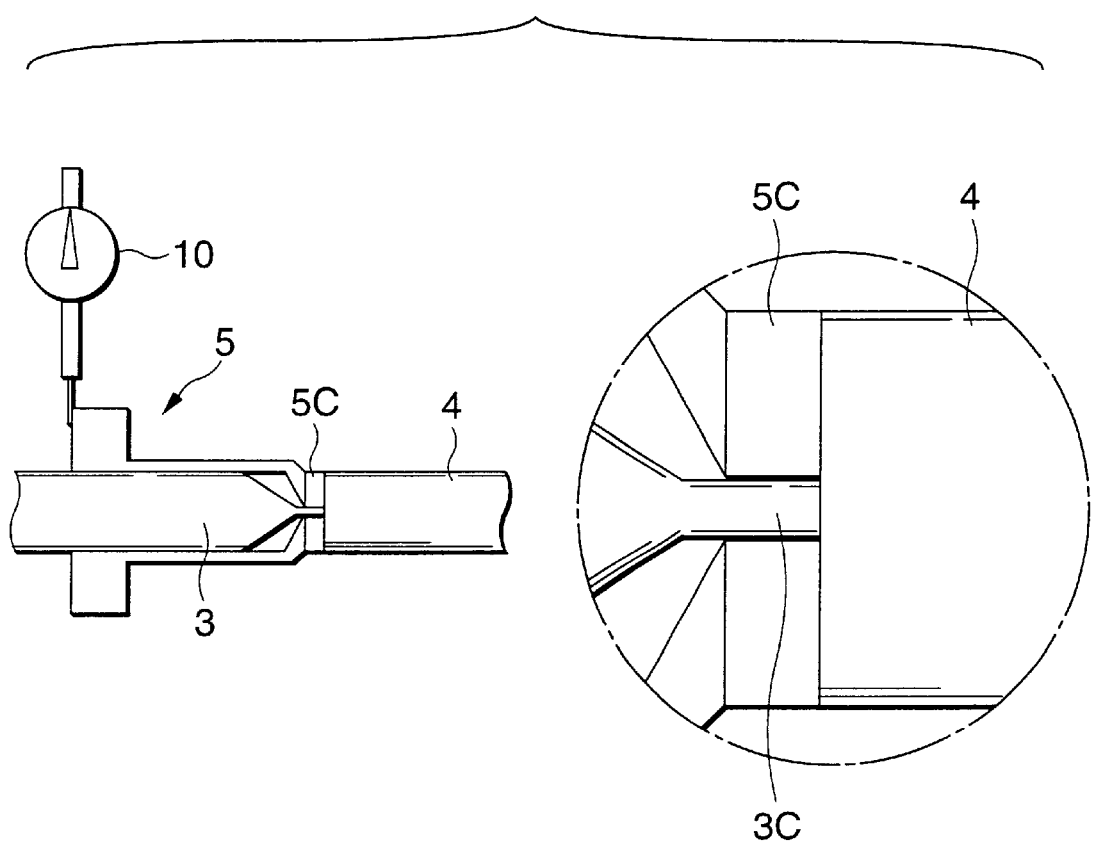
FIG. 7 is a view showing a condition in which a zero point adjustment is effected in FIG. 6.

For measuring the object by the use of the micrometer 1, the thimble 9 of the micrometer 1 is first turned to move the spindle 4 to bring the distal end of the spindle 4 into abutting engagement with the distal end of the pin 3C of the anvil 3 and the distal end of the blade portion 5C of the detection portion 5. In this condition, the pointer position of the dial gauge 10, contacted at its distal end with the end surface of the flange 5B of the detection portion 5, is set or adjusted to read 0 (zero), as shown in FIG. 7. This is a so-called zero point adjustment.

Figure 8:
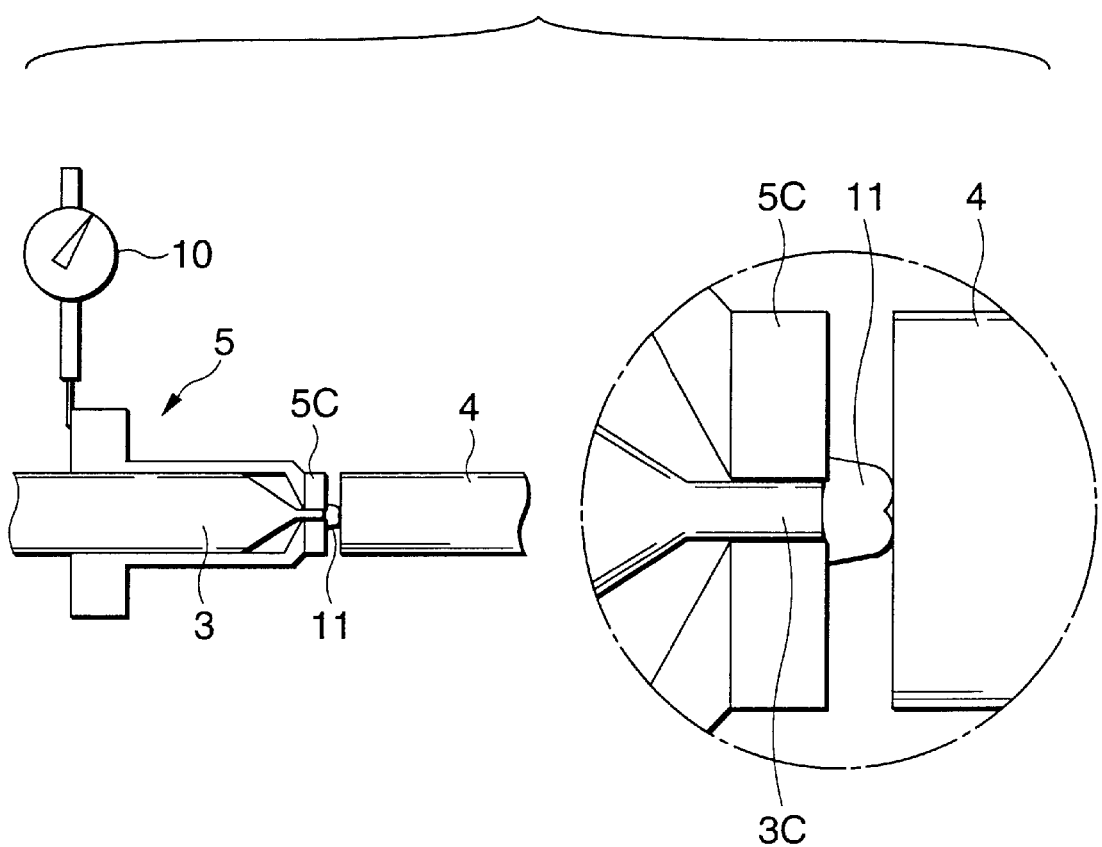
FIG. 8 is a view showing a condition in which a normal product of FIG. 6 is measure.

Then, the thimble 9 of the micrometer 1 is turned to move the spindle 4 in an opening direction (that is, a direction away from the anvil 3) to provide a space therebetween. Thereafter, the object 11 to be measured is inserted between the anvil and the spindle, and then the thimble 9 is again turned to move the spindle 4 in a closing direction (that is, a direction toward the anvil 3), so that the distal end of the spindle 4 presses the object 11 against the anvil 3 under a predetermined pressure, as shown in FIG. 8. At this time, the distal end of the blade portion 5C of the detection portion 5 projects beyond the distal end of the pin 3C of the anvil 3, and the pointer of the dial gauge 10 shifts to the minus (−) side, so that it is determined that the object to be measured is a normal product.

In the case where it is determined that the object to be measured is a normal product when the pointer of the dial gauge 10 shifts to the minus (−) side, it is determined that the object 11 to be measured is an abnormal product (having rear burrs formed thereon) when the pointer of the dial gauge 10 is kept at the position of 0 (zero) or shifts to the plus (+) side.

Figure 9:
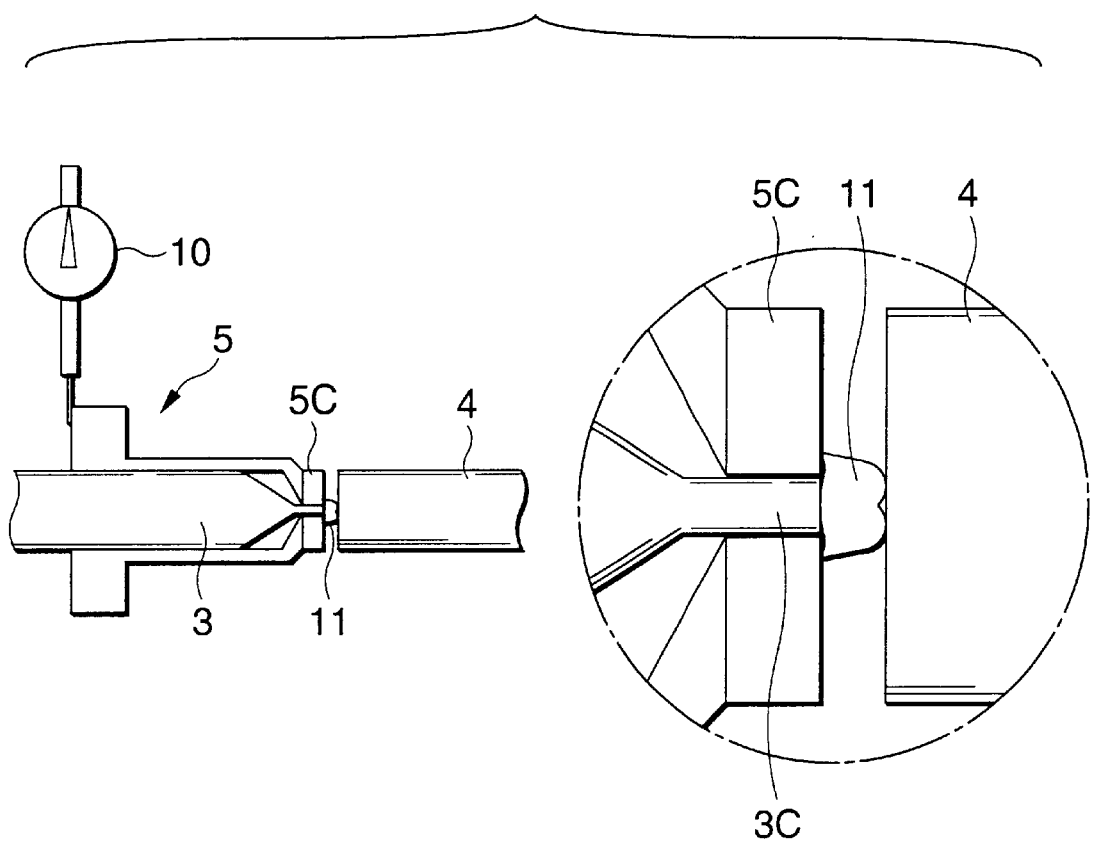
FIG. 9 is a view showing a measurement condition in which a radius (R) portion and distal ends of rear burrs in FIG. 6 are disposed at the same position.

The pointer of the dial gauge 10 is kept at the position of 0 (zero) when distal ends of the rear burrs are disposed flush with a peak (outermost portion) of a radius (R) portion of the object to be measured, as shown in FIG. 9. More specifically, the object 11 to be measured is inserted between the anvil 3 and the spindle 4, and then the thimble 9 is turned to move the spindle 4 in the closing direction, so that the distal end of the spindle 4 presses the object 11 against the anvil 3 under the predetermined pressure. At this time, the distal end of the pin 3C of the anvil 3 abuts against the peak of the radius (R) portion of the object 11 while the distal end of the blade portion 5C of the detection portion 5 abuts against the distal ends of the rear burrs formed on the object 11. In this condition, the distal end of the pin 3C of the anvil 3 and the distal end of the blade portion 5 of the detection portion 5 are disposed at the same position. At this time, the pointer of the dial gauge 10 indicates 0 (zero).

Figure 10:
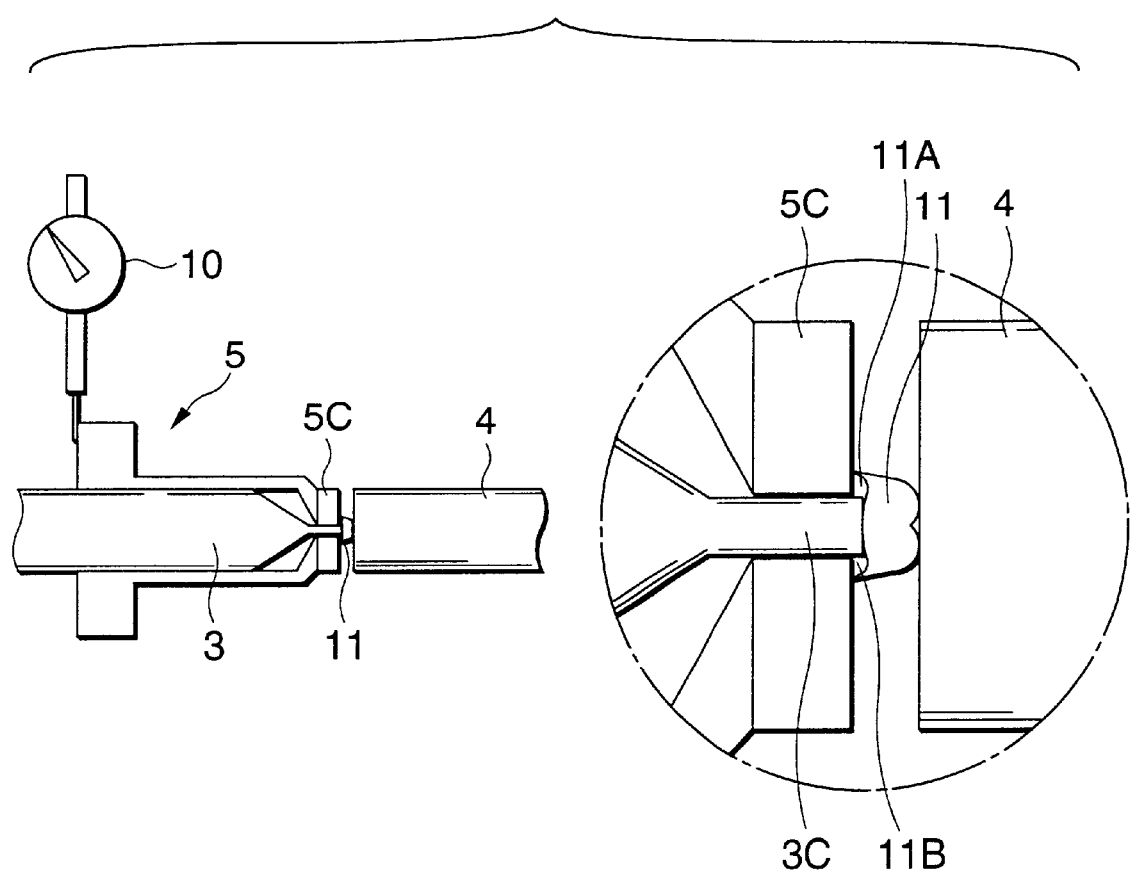
FIG. 10 is a view showing a measurement condition in which distal ends of two rear burrs project beyond the radius (R) portion of FIG. 6.

The pointer of the dial gauge 10 shifts to the plus (+) side when rear burrs 11A and 11B, formed respectively at opposite side portions of the object 11 to be measured, project beyond the radius (R) portion, as shown in FIG. 10. More specifically, the object 11 to be measured is inserted between the anvil 3 and the spindle 4, and then the thimble 9 is turned to move the spindle 4 in the closing direction, so that the distal end of the spindle 4 presses the object 11 against the anvil 3 under the predetermined pressure. At this time, the distal end of the pin 3C of the anvil 3 abuts against the peak of the radius (R) portion of the object 11 while the distal end of the blade portion 5C of the detection portion 5 abuts against the distal ends of the rear burrs 11A and 11B formed respectively at the opposite side portions of the object 11. In this condition, the distal end of the pin 3C of the anvil 3 projects beyond the distal end of the blade portion 5 of the detection portion 5, and therefore the pointer of the dial gauge 10 shifts to the plus (+) side, thus detecting the formation of the rear burrs on the object 11.

Figure 11:
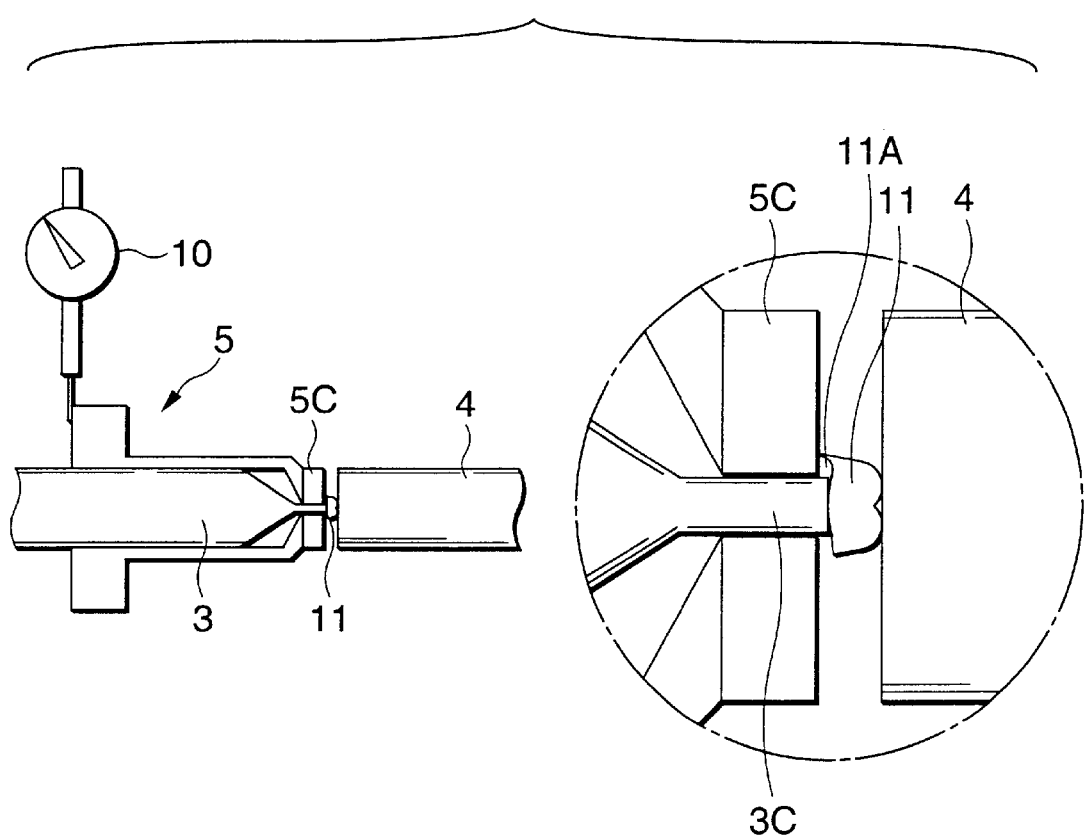
FIG. 11 is a view showing a measurement condition in which a single burr projects beyond the radius (R) portion of FIG. 6.

The pointer of the dial gauge 10 also shifts to the plus (+) side when a rear burr 11A is formed only on one side portion of the object 11 to be measured, and projects beyond the radius (R) portion, as shown in FIG. 11. More specifically, the object 11 to be measured is inserted between the anvil 3 and the spindle 4, and then the thimble 9 is turned to move the spindle 4 in the closing direction, so that the distal end of the spindle 4 presses the object 11 against the anvil 3 under the predetermined pressure. At this time, the distal end of the pin 3C of the anvil 3 abuts against the peak of the radius (R) portion of the object 11 while the distal end of the blade portion 5C of the detection portion 5 abuts against the distal end of the rear burr 11A formed on the one side portion of the object 11. In this condition, the distal end of the pin 3C of the anvil 3 projects beyond the distal end of the blade portion 5 of the detection portion 5, and therefore the pointer of the dial gauge 10 shifts to the plus (+) side, thus detecting the formation of the rear burr on the object 11.

Thus, it is determined by the use of the micrometer of this embodiment whether or not any rear burr is formed on the object 11 to be measured, and by doing so, the burrs will not be crushed by the anvil 3 and the spindle 4 in contrast with the related construction, and besides in contrast with the related construction, a change of the measured value due to the shifting of the measurement position will not occur even when a rear bur is formed on one side portion of the object to be measured. Thus, these disadvantages of the related construction can be eliminated, and whether any rear burr is present or absent can be stably determined in a short time without causing any misdetermination.

Figure 12:
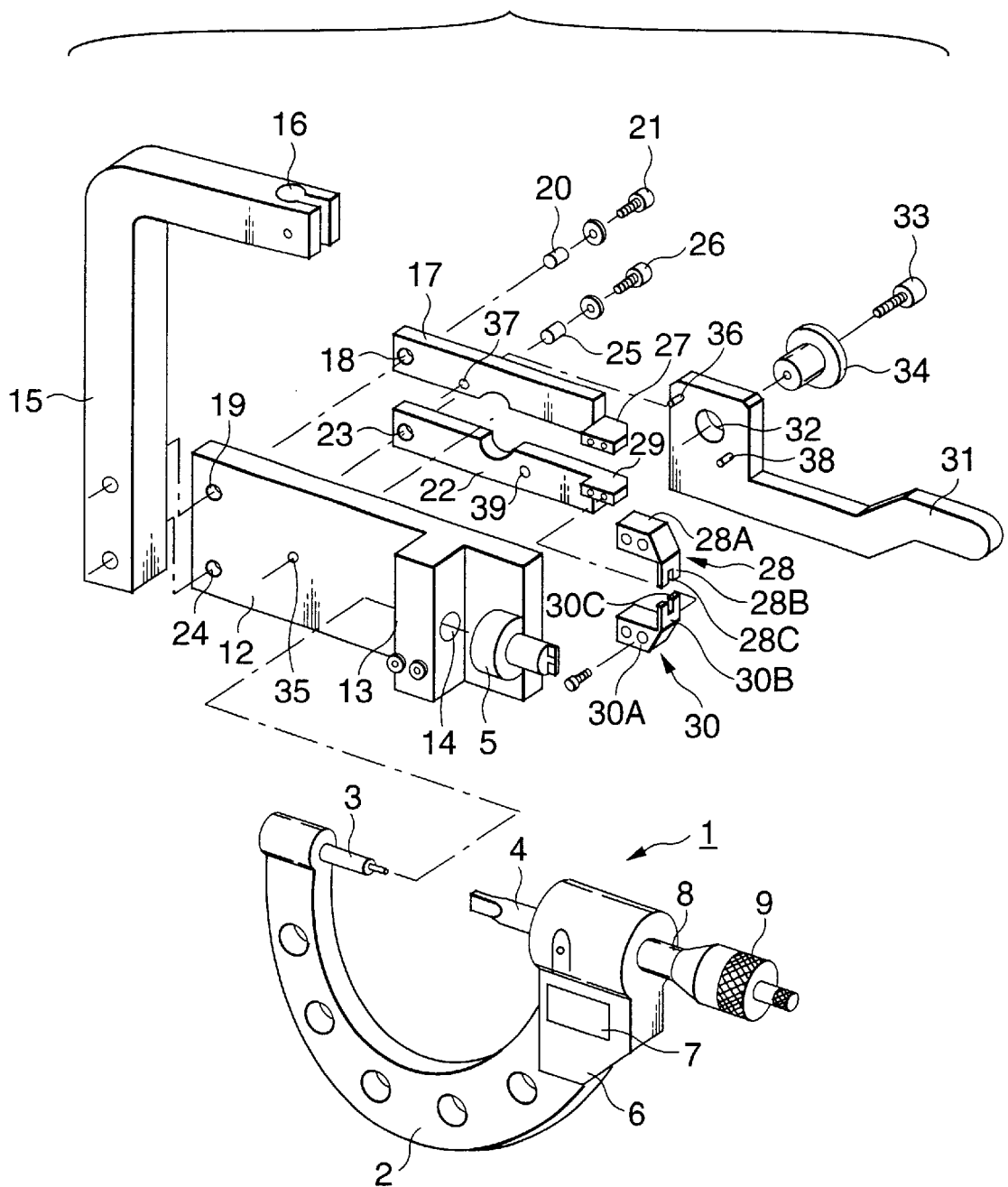
FIG. 12 is a view showing a overall construction of another embodiment of a micrometer of the present invention.

FIG. 12 shows another embodiment of a micrometer of the present invention.

In the drawings, the micrometer 1 includes a bow-like frame 2, and an inwardly-directed anvil 3 is provided at one end of the frame 2. An inwardly-directed spindle 4 is slidably provided at the other end of the frame 2.

A detection portion 5 is fitted on the anvil 3.

A switch portion 6 is mounted on the frame 2.

Reference numeral 7 denotes a display portion for displaying a measured value, reference numeral 8 a sleeve, and reference numeral 9 a thimble. The relation between the anvil 3 and the detection portion 5 in this embodiment is similar to the relation between the anvil 3 and the detection portion 5 in the embodiment of FIG. 11 and is shown in FIG. 2. More specifically, the anvil 3 includes a rod-like anvil body 3A having a distal end formed into a tapering portion 3B. A pin 3C of a smaller diameter is formed on and projects from a distal end of the tapering portion 3B along the axis of the anvil body 3A.

The detection portion 5 in this embodiment is similar to the detection portion 5 in the embodiment of FIG. 1, and is shown in FIGS. 3 to 5. More specifically, the detection portion 5 is formed into a cylindrical shape, and includes a detection portion body 5A having an open rear end. A flange 5B, having a diameter larger than the diameter of the detection portion body 5A, is formed on the rear end of the detection portion body 5A. A distal or front end of the detection body portion 5A is closed, and a plate-like blade portion 5C is formed on an outer surface of this distal end. A hole 5D is formed in a central portion of the distal end of the detection portion body 5A.

An opening-closing base 12 is in the form of a rectangular plate, and a rectangular tooth 13 is formed on and projects from one side (face) of the opening-closing base 12. A hole 14 is formed through the tooth 13, and the anvil 3 of the micrometer 1 is fitted in this hole 14, and the detection portion 5 is fitted on the distal end portion of the anvil 3 projecting outwardly from the hole 14.

A support arm 15 of an L-shape has a distal end portion bent at an angle of substantially 90 degrees, and is fixedly secured to the opening-closing base 12. A groove 16 is formed in the distal end of the support arm 15, and a dial gauge (not shown), which works in a similar manner to the dial gauge shown in FIGS. 6–11, for contact with the detection portion 5 at its distal end is supported in this groove 16 formed in the distal end of the support arm 15. A pointer position of the dial gauge is adjusted or set to read 0 (zero) when a distal end of a detection portion of the dial gauge contacts the detection portion 5. The pointer of the dial gauge shifts to the plus (+) side and the minus (−) side in accordance with the movement of the detection portion 5.

An upper opening-closing member 17 has a hole 18 formed through one end portion thereof. A collar 20 is fitted into this hole 18, and a bolt 21 is threaded into a hole 19 formed through the opening-closing base 12, thereby connecting the upper opening-closing member 17 to the opening-closing base 12. Therefore, the upper opening-closing member 17 is pivotally movable about the hole 18.

A lower opening-closing member 22 has a hole 23 formed through one end portion thereof. A collar 25 is fitted into this hole 23, and a bolt 26 is threaded into a hole 24 formed through the opening-closing base 12, thereby connecting the lower opening-closing member 22 to the opening-closing base 12. Therefore, the lower opening-closing member 22 is pivotally movable about the hole 23.

A claw-mounting portion 27 is formed at the other end of the upper opening-closing member 17, and an upper gripping claw 28 is removably mounted on the claw-mounting portion 27 by bolts or the like. A claw-mounting portion 29 is formed at the other end of the lower opening-closing member 22, and a lower gripping claw 30 is removably mounted on the claw-mounting portion 29 by bolts or the like.

The upper gripping claw 28 is so provided as to be disposed above an object (not shown) to be measured which is inserted between the spindle 4 and the pin 3C of the anvil 3 (and the blade portion 5C of the detection portion 5). The upper gripping claw 28 includes a block 28A secured to the claw-mounting portion 27 by the bolts, and a downwardly-projecting claw portion 28B is formed at a distal end of the block 28A. The claw portion 28B is in the form of a thin plate with a predetermined width, and has a U-shaped groove 28C formed in a central portion thereof. This groove 28C is provided so that the claw portion 28B will not interfere with the blade portion 5C of the detection portion 5 and a blade portion of the spindle 4 when the upper gripping claw 28 is to be brought into gripping engagement with the object to be measured.

The lower gripping claw 30 is so provided as to be disposed beneath the object to be measured which is inserted between the spindle 4 and the pin 3C of the anvil 3 (and the blade portion 5C of the detection portion 5). The lower gripping claw 30 includes a block 30A secured to the claw-mounting portion 29 by the bolts, and an upwardly-projecting claw portion 30B is formed at a distal end of the block 30A. The claw portion 30B is in the form of a thin plate with a predetermined width, and has a U-shaped groove 30C formed in a central portion thereof. This groove 30C is provided so that the claw portion 30B will not interfere with the blade portion 5C of the detection portion 5 and the blade portion of the spindle 4 when the lower gripping claw 30 is to be brought into gripping engagement with the object to be measured.

A lever 31 is provided for moving the upper and lower gripping claws 28 and 30, mounted respectively on the distal ends of the upper and lower opening-closing members 17 and 22, away from each other. A hole 32 is formed through the lever 31, and a bushing 34 is fitted in this hole 32, and the lever 31 is pivotally mounted on the opening-closing base 12 through this bushing by a bolt 33 threaded into a hole 35 formed through the opening-closing base 12. A pin 36 is formed on the lever 31, and is fitted in a hole 37 formed through the upper opening-closing member 17. A pin 38 is also formed on the lever 31, and is fitted in a hole 39 formed through the lower opening-closing member 22.

The micrometer 1 is mounted on the opening-closing base 12, and the upper opening-closing member 17, the lower opening-closing member 22 and the lever 31 are mounted on the opening-closing base 12. With additional reference to FIG. 13, a top plan view of this condition is-shown, with the claw-mounting portion 27 of the upper opening-closing member 17, the upper gripping claw 28 (mounted on the claw-mounting portion 27), the claw-mounting portion 29 of the lower opening-closing member 22 and the lower gripping claw 30 (mounted on the claw-mounting portion 29) omitted.

In the drawings, a distal end stopper 40 comprises a micrometer head.

Reference numeral 41 denotes a spindle, reference numeral 42 a sleeve, and reference numeral 43 a thimble. Reference numeral 44 denotes a switch portion, and reference numeral 45 a display portion for displaying a measured value. This distal end stopper 40 is provided perpendicularly to the micrometer 1, and is supported by a support device (not shown) in such a manner that a distal end of the spindle 41 is disposed in the vicinity of the blade portion 5C of the detection portion 5 of the micrometer 1. When any object is not abutted against the distal end of the spindle 41, 0 (zero) is displayed in the display portion 45. The object 11 to be measured is inserted between the anvil 3 and the spindle 4 in a direction of arrow A (FIG. 13), and when a distal end of this object 11 is abutted and pressed against the distal end of the spindle 41, a plus (+) value or a minus (−) value is displayed in the display portion 45. It is determined from this whether or not the object 11 to be measured has been inserted into a predetermined position between the anvil 3 and the spindle 4.

Figure 13:
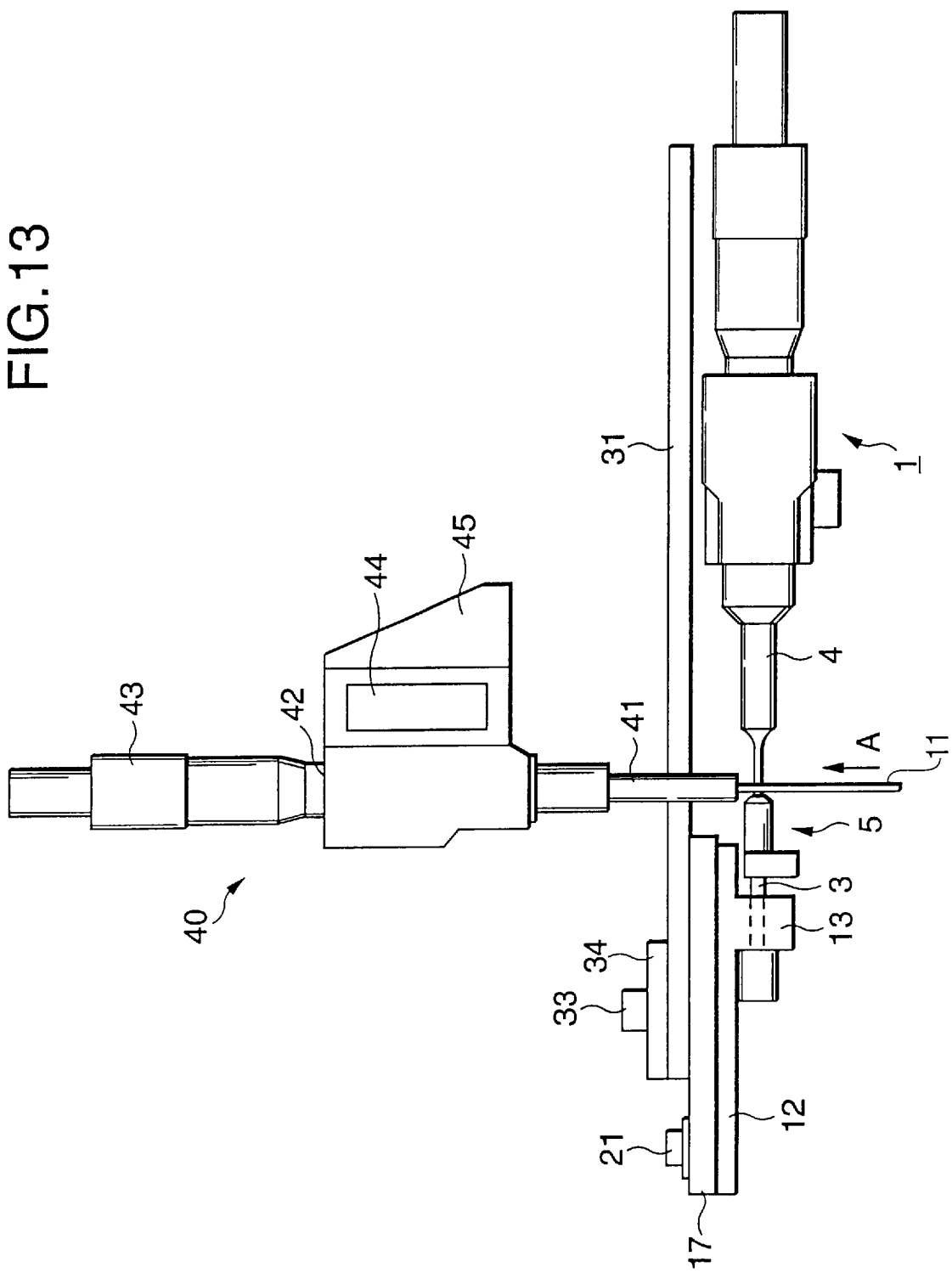
FIG. 13 is a plan view showing the micrometer of FIG. 12 in its installed condition.

FIG. 13 shows a condition in which the object 11 to be measured is inserted between the anvil 3 and the spindle 4 in the direction of arrow A (FIG. 13), so that the distal end of the object 11 is abutted against the distal end of the spindle 41, and therefore the object 11 to be measured is held in the predetermined position.

Figure 14:
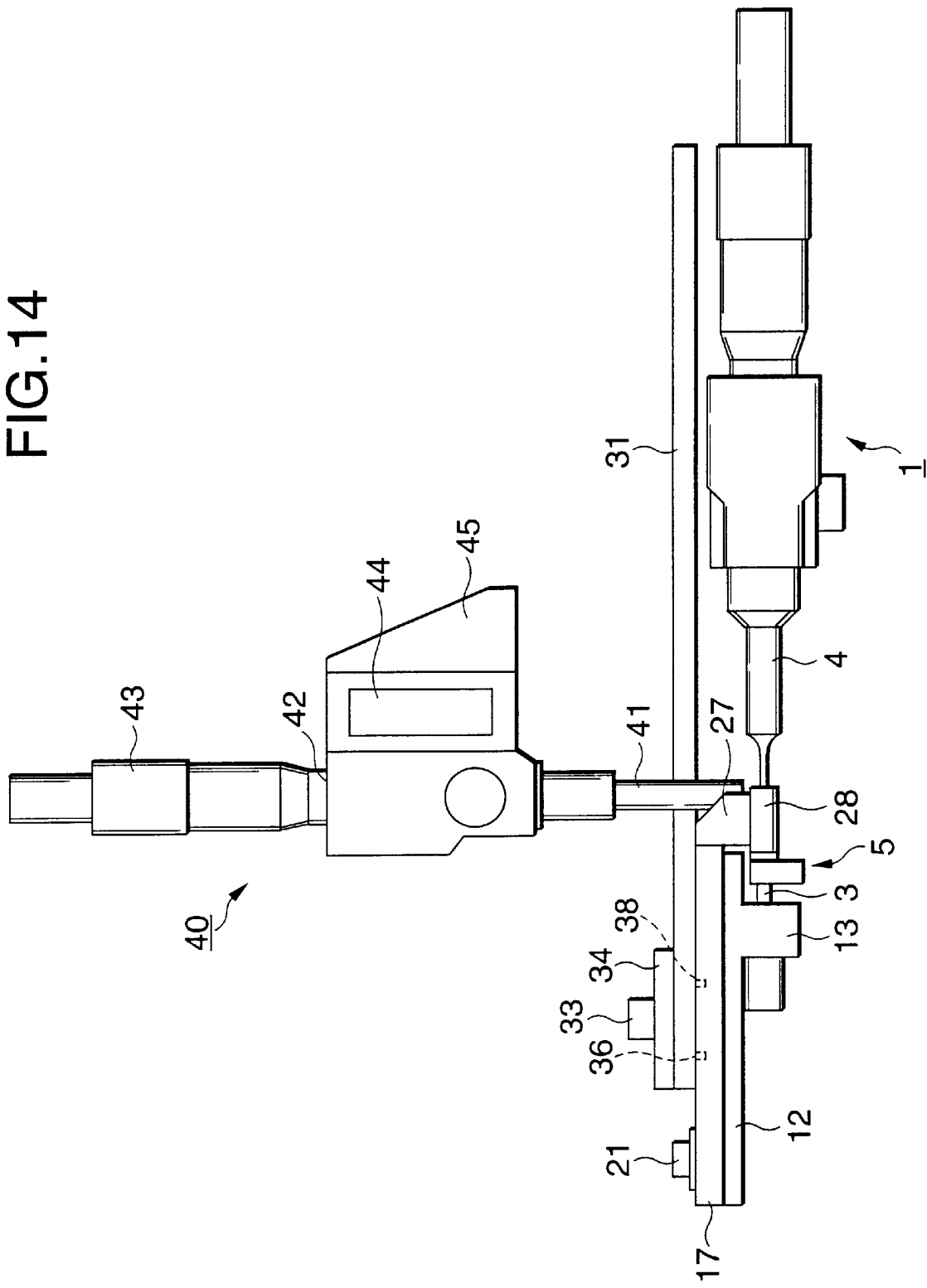
FIG. 14 is a plan view of the micrometer of FIG. 12 in its installed condition.

With additional reference to FIG. 14, a top plan view of a condition in which the micrometer 1 is mounted on the opening-closing base 12, is shown, and the upper and lower opening-closing members 17 and 22 and the lever 31 are mounted on the opening-closing base 12. Those figures show the positions of the claw-mounting portion 27 of the upper opening-closing member 17 and the upper gripping claw 28, mounted on the claw-mounting portion 27 (and hence the positions of the claw-mounting portion 29 of the lower opening-closing member 22 and the lower gripping claw 30, mounted on the claw-mounting portion 29), relative to the pin 3C of the anvil 3 of the micrometer 1, the blade portion 5C of the detection portion 5, the distal end of the spindle 4 and the spindle 41 of the distal end stopper 40.

Figure 15:
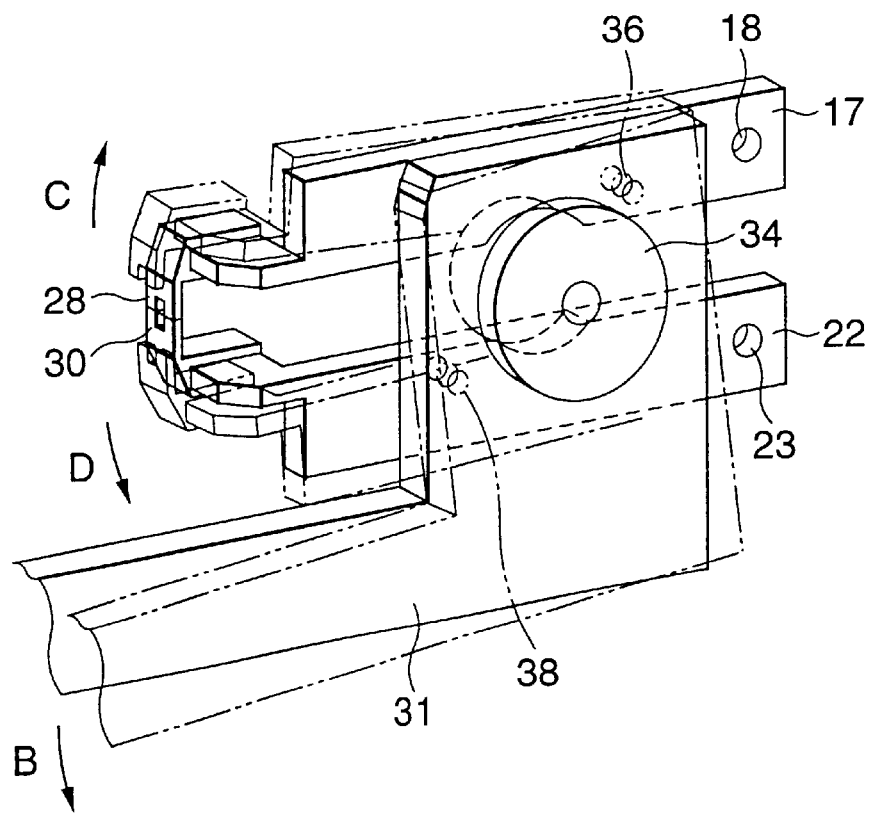
FIG. 15 is a view explanatory of an open and a closed condition of upper and lower gripping claws.
Figure 16:
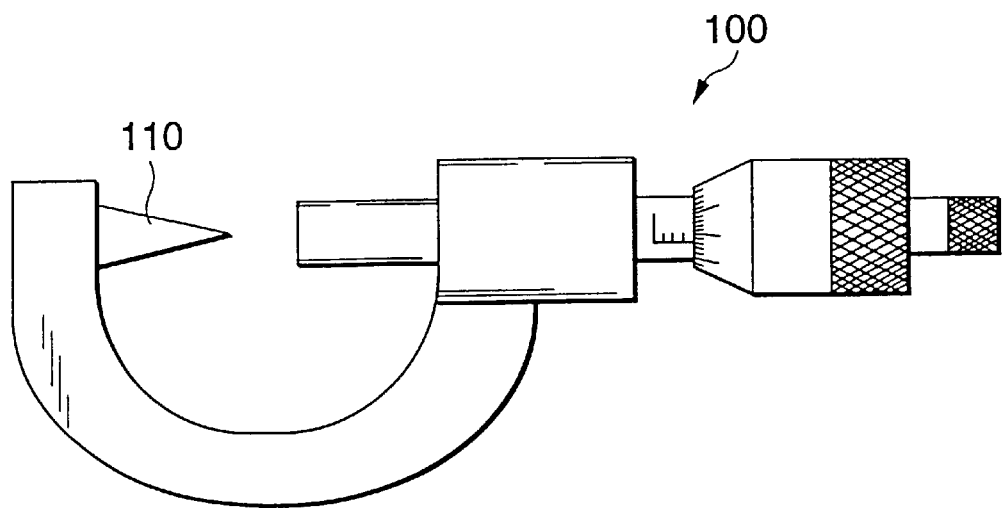
FIG. 16 is a view showing a related point micrometer.
Figure 17:
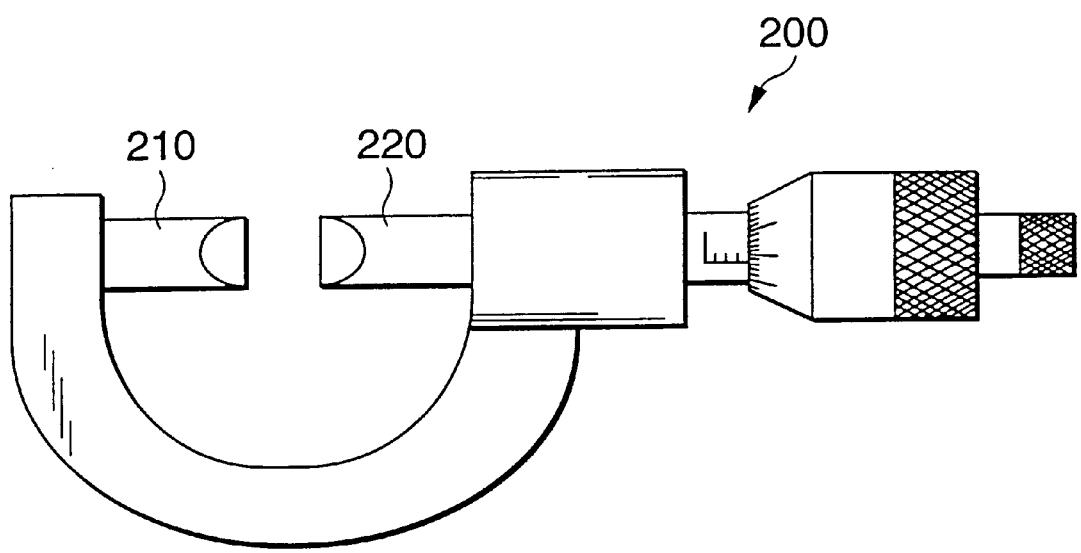
FIG. 17 is a view showing a related blade micrometer.
Figure 18A:
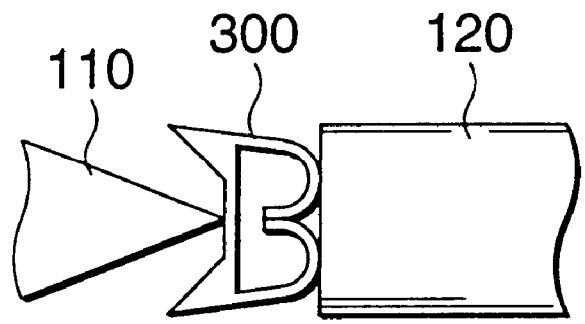
FIGS. 18A and 18B are views showing a measurement method using the related point micrometer and blade micrometer.
Figure 18B:
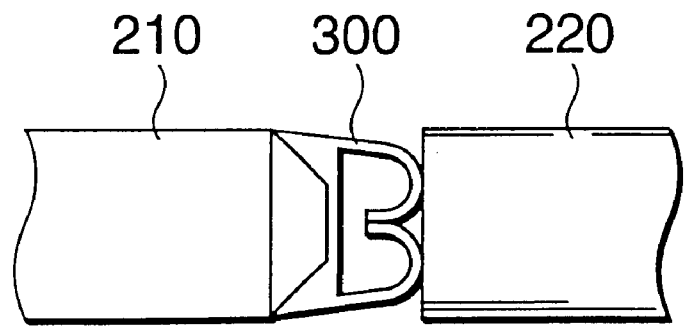

With additional reference to FIG. 15, the relation between the upper opening-closing member 17, the lower opening-closing member 22 and the lever 31, is shown. The lever 31 is pivotally movable about the bushing 34. When the lever 31 is pivotally moved in a direction of arrow B, the upper opening-closing member 17 is pivotally moved in the opening direction (indicated by arrow C) about the collar 20 since the pin 36 on the lever 31 is fitted in the hole 37. Also, when the lever 31 is pivotally moved in the direction of arrow B, the lower opening-closing member 22 is pivotally moved in the opening direction (indicated by arrow D) about the collar 25 since the pin 38 on the lever 31 is fitted in the hole 39. Thus, the gripping claws (the upper and lower gripping claws 28 and 30) can be moved away from each other by pivotally moving the lever 31 in the direction of arrow B (that is, in the downward direction).

Therefore, in this embodiment, the centering of the object 11 to be measured, as well as the setting of the object 11 in the predetermined position, can be effected easily. Therefore, burrs will not be crushed by the anvil 3 and the spindle 4 in contrast with the related construction, and besides in contrast with the related construction, a change of the measured value due to the shifting of the measurement position will not occur even when a rear bur is formed on one side portion of the object to be measured. Thus, these disadvantages of the related construction can be eliminated, and whether any rear burr is present or absent can be stably determined in a short time without causing any misdetermination.

The present invention has the above construction, and therefore the following advantageous effects are achieved.

In the present invention, the measurement can be effected in a short time, and misdeterminations can be reduced, and the stable measured values can be obtained.

In the present invention, the object to be measured can be easily located in the predetermined position, that is, in the axes of the anvil and the spindle, and therefore the measurement can be effected in a short time, and misdeterminations can be reduced, and the stable measured values can be obtained.

In the present invention, when the distal end of the object to be measured reaches the measurement position, it is prevented from further moving beyond the measurement position, and therefore the distal end of the object to be measured can be easily and accurately located in the measurement position.

In the present invention, the distal end of the object to be measured can be easily located in the axes of the anvil and the spindle.

In the present invention, the distal end of the object to be measured can be located in the axes of the anvil and the spindle with one touch.

What is claimed is:

1. A micrometer, comprising:
   a spindle having a distal end formed in a flat plate-like manner;
   an anvil including an anvil body formed into a rod-like shape;
   a pin having a diameter smaller than the anvil body and a predetermined length, the pin being formed on a distal end of the anvil body; and
   a detection portion of a tubular shape fitted on the anvil body, the detection portion being slidably moved along the anvil body, a distal end of the detection portion being formed into a plate-like shape, and the detection portion including a pin insertion hole formed in a central portion of the distal end of the detection portion, wherein the pin is insertable into the pin insertion hole so that the pin projects from the distal end of the detection portion.

2. The micrometer of claim 1, wherein when the distal end of the detection portion is brought into an abutted engagement with the object to be measured, an amount of the sliding movement of the detection portion relative to the pin of the anvil body is operative to determine whether the object to be measured is an appropriate one.

3. The micrometer of claim 1, further comprising:
   a distal end stopper brought into contact with a distal end of the object to be measured, so as to locate the distal end of the object in a predetermined position; and
   a centering device which grips the object to be measured so as to center the object relative to the anvil and the spindle when the distal end of the object to be measured is abutted against a distal end of the distal end stopper,
   wherein the object to be measured is abutted against the distal end stopper so that the object is located in a predetermined position, and is gripped to be located in a centered position between the anvil and the spindle, and then the distal end of the detection portion is brought into abutting engagement with the object to be measured, so that whether the object to be measured is an appropriate one is detected from an amount of the sliding movement of the detection portion relative to the pin of the anvil body.

4. A micrometer according to claim 3, wherein the distal end stopper includes a micrometer head.

5. A micrometer according to claim 3, wherein the centering device straddles the distal end of the anvil at the distal end of the spindle, and grips the object from upper and lower sides of the object at distal end measuring portions of the spindle and the anvil intersecting a direction of insertion of the object, thereby centering the object.

6. A micrometer according to claim 3, in which the centering device comprises a pair of upper and lower claws which hold the object to be measured therebetween from upper and lower sides of the object, and the pair of claws can be moved toward and away from each other by moving a lever upwardly and downwardly.

7. A micrometer according to claim 1, wherein the presence of a burr is determined by a detection of the amount of the sliding movement of the distal end of the detection portion relative to the distal end of the pin of the anvil body.

8. A measuring system, comprising: a micrometer including,

- a spindle having a distal end formed in a flat plate-like manner;
- an anvil including an anvil body formed into a rod-like shape;
- a pin having a diameter smaller than the anvil body and a predetermined length, the pin being formed on a distal end of the anvil body; and
- a detection portion of a tubular shape fitted on the anvil body, the detection portion being slidably moved along the anvil body, a distal end of the detection portion being formed into a plate-like shape, and the detection portion including a pin insertion hole formed in a central portion of the distal end of the detection portion, wherein the pin is insertable into the pin insertion hole so that the pin projects from the distal end of the detection portion; and a dial gauge, wherein the dial gauge is brought at its distal end into contact with the detection portion, the dial gauge being capable of indicating one of a plus value and a minus value in accordance with a sliding movement of the detection portion, and wherein the distal end of the detection portion is abutted against the distal end of the spindle, and when a distal end of the pin of the anvil body coincides with the distal end of the detection portion, the dial gauge is set to a zero point, and wherein an object to be measured is inserted between the detection portion and the spindle.

* * * * *